United States Patent
Han et al.

(10) Patent No.: US 10,791,528 B2
(45) Date of Patent: Sep. 29, 2020

(54) METHOD, CELL AND SYSTEM FOR IMPLEMENTING AIR INTERFACE SYNCHRONIZATION

(71) Applicant: ZTE Corporation, Shenzhen (CN)

(72) Inventors: Xiaogang Han, Shenzhen (CN); Wei Gou, Shenzhen (CN); Yajun Zhao, Shenzhen (CN); Feng Bi, Shenzhen (CN)

(73) Assignee: ZTE CORPORATION (CN)

( * ) Notice: Subject to any disclaimer, the term of this patent is extended or adjusted under 35 U.S.C. 154(b) by 283 days.

(21) Appl. No.: 15/112,015

(22) PCT Filed: Dec. 10, 2014

(86) PCT No.: PCT/CN2014/093506
§ 371 (c)(1),
(2) Date: Jul. 15, 2016

(87) PCT Pub. No.: WO2015/109896
PCT Pub. Date: Jul. 30, 2015

(65) Prior Publication Data
US 2016/0337994 A1    Nov. 17, 2016

(30) Foreign Application Priority Data
Jan. 24, 2014  (CN) .......................... 2014 1 0035868

(51) Int. Cl.
*H04W 56/00* (2009.01)
*H04W 84/04* (2009.01)
*H04W 88/08* (2009.01)

(52) U.S. Cl.
CPC ......... *H04W 56/001* (2013.01); *H04W 56/00* (2013.01); *H04W 56/003* (2013.01); *H04W 84/045* (2013.01); *H04W 88/08* (2013.01)

(58) Field of Classification Search
CPC ............ H04W 56/0005; H04W 56/001; H04W 56/0015; H04W 56/002; H04W 56/0025;
(Continued)

(56) References Cited

U.S. PATENT DOCUMENTS

| 2011/0122849 A1 | 5/2011 | Jain et al. |
| 2012/0122440 A1* | 5/2012 | Krishnamurthy ..... H04L 5/0053 455/418 |

(Continued)

FOREIGN PATENT DOCUMENTS

| CN | 1744741 A | 3/2006 |
| CN | 101123468 A | 2/2008 |

(Continued)

OTHER PUBLICATIONS

CMCC, Discussion on air-interface based small cell synchronization, 3GPP TSG RAN WG1 Meeting #74 Barcelona, Spain, Aug. 19-23, 2013, R1-133524 (Year: 2013).*

(Continued)

*Primary Examiner* — George Eng
*Assistant Examiner* — Hung K Du
(74) *Attorney, Agent, or Firm* — McDonald Hopkins LLC

(57) ABSTRACT

Disclosed is a method for implementing air interface synchronization. The method includes that: a source cell performs signalling interaction with a target cell, and determines whether to be switched off or not according to a signalling interaction result. A content about which the source cell performs signalling interaction with the target cell includes at least one of: on/off state information of the source cell, on/off state information of the target cell, whether the target cell finds a new synchronization source or not, timing at which the source cell enters an off state, candidate synchronization source cell set information of the target cell and associated affiliated target cell information of (Continued)

the target cell. The present disclosure further discloses a cell and system for implementing air interface synchronization.

12 Claims, 2 Drawing Sheets

(58) Field of Classification Search
CPC . H04W 16/08; H04W 16/32; H04W 52/0206; H04W 72/0406; H04W 72/0413; H04W 72/042; H04W 72/0426; H04W 72/0433; H04W 84/045; H04W 56/00; H04W 56/003; H04W 56/0065; H04W 88/08
See application file for complete search history.

(56) References Cited

U.S. PATENT DOCUMENTS

| | | | |
|---|---|---|---|
| 2012/0322445 A1* | 12/2012 | Kwon | H04W 52/04 455/436 |
| 2013/0053051 A1* | 2/2013 | Fang | H04W 52/0206 455/452.1 |
| 2014/0199982 A1* | 7/2014 | Hahn | H04W 16/02 455/418 |
| 2015/0003312 A1* | 1/2015 | Jeong | H04W 52/0235 370/311 |
| 2015/0065108 A1* | 3/2015 | Bedekar | H04W 24/02 455/418 |
| 2016/0044576 A1* | 2/2016 | Hahn | H04W 52/0206 455/434 |
| 2016/0165560 A1 | 6/2016 | Takeda et al. | |
| 2016/0192304 A1* | 6/2016 | Yi | H04B 7/2656 370/311 |

FOREIGN PATENT DOCUMENTS

| | | |
|---|---|---|
| CN | 101841904 A | 9/2010 |
| CN | 101938824 A | 1/2011 |
| CN | 102014405 A | 4/2011 |
| CN | 102347821 A | 2/2012 |
| CN | 102740339 A | 10/2012 |
| CN | 102761956 A | 10/2012 |
| CN | 103250451 A | 8/2013 |
| CN | 103428714 A | 12/2013 |
| CN | 103442426 A | 12/2013 |
| EP | 2398284 A1 | 12/2011 |
| EP | 2568740 A1 | 3/2013 |
| EP | 3026965 A1 | 6/2016 |
| WO | 2010148981 A1 | 12/2010 |

OTHER PUBLICATIONS

International Search Report in international application No. PCT/CN2014/093506, dated Mar. 11, 2015.
English Translation of the Written Opinion of the International Search Authority in international application No. PCT/CN2014/093506, dated Mar. 11, 2015.
Supplementary European Search Report in European application No. 14880229.1, dated Dec. 22, 2016.
Catt: "The solution for the compensation scenario",3GPP Draft; R3-120512, 3rd Generation Partnership Project (3GPP), Mobile Competence Centre ; 650, Route Des Lucioles ; F-06921 Sophia-Antipolis Cedex ;France, Apr. 2, 2012 (Apr. 2, 2012), XPO50668877, Retrieved from the Internet:URL:http://www.3gpp.org/ftp/tsg_ran/WG3_Iu /TSGR3—75bis/Docs/ [retrieved on Apr. 2, 2012]mailed on Apr. 2, 2012.
Catt: "Discussion on air interface based synchronization for small cells",3GPP Draft; RI-134107, 3rd Generation Partnership Project (3GPP), Mobile Competence Centre ; 650, Route Des Lucioles ; F-06921 Sophia-Antipolis Cedex ;France , vol. RAN WG1, No. Guangzhou, China; Oct. 7, 2013-Oct. 11, 2013 Sep. 28, 2013 (Sep. 28, 2013), XP050717299,Retrieved from the Internet:URL:http://www.3gpp.org/ftp/tsg_ran/WGI_RL 1/TSGR1-74b/Docs/—~[retrieved on Sep. 28, 2013]mailed on Sep. 28, 2013.
ZTE: "Considerations on radio-interface based synchronization", GPP Draft; RI-134319 Considerations on Radio-Interface Based Synchronization, 3rd Generation Partnership Project (3GPP), Mobile Competence Centre ; 650, Route Des Lucioles ; F-06921 Sophia-Antipolis vol. RAN WG1, No. Guangzhou, China; Oct. 7, 2013-Oct. 11, 2013 Sep. 28, 2013 (Sep. 28, 2013), XP050717463,Retrieved from the Internet:URL:http://www.3gpp.org/ftp/tsg_ran/WGI_RL I/TSGRI_74b/Docs/ [retrieved on Sep. 28, 2013]mailed on Sep. 28, 2019.
R1-133524 Discussion on air-interface based small cell synchronization, 3GPP, Aug. 19, 2013-Aug. 23, 2013.

* cited by examiner

METHOD, CELL AND SYSTEM FOR IMPLEMENTING AIR INTERFACE SYNCHRONIZATION

TECHNICAL FIELD

The present disclosure relates to an air interface synchronization technology in wireless communications, and in particular to a method, cell and system for implementing air interface synchronization.

BACKGROUND

In a Long Term Evolution/Long Term Evolution-Advanced (LTE/LTE-A) mobile communication system, good synchronization between Evolved Node Bs (eNBs) may achieve higher system performance. For example, in an interference coordination/interference avoidance scenario, a multimedia broadcast and multicast service, a carrier aggregation scenario or the like, synchronization between eNBs is a necessary condition for normal operation of these services. During the synchronization between eNBs, the eNB which provides synchronization information is called a source eNB or a source cell, and the eNB which receives the synchronization information is called a target eNB or a target cell, wherein the synchronization information is a signal, or a channel or the like.

In deployment of small cells in the LTE/LTE-A, particularly high-density deployment of the small cells, a small cell switching mechanism is introduced in consideration of energy saving and interference reduction of an eNB. A small cell enters an off state at a certain time based on a certain criterion. In the off state, the eNB may not normally send an air interface synchronization reference signal, so that a target eNB monitors the eNB cannot detect the normal synchronization reference signal and thus gets out of synchronization, and furthermore, synchronization of an eNB which takes the target eNB as a synchronization source is influenced.

SUMMARY

In order to solve the existing technical problems, the embodiments of the present disclosure provide a method, cell and system for implementing air interface synchronization.

The embodiments of the present disclosure provide a method for implementing air interface synchronization, which includes that:

a source cell performs signalling interaction with a target cell, and determines whether to be switched off or not according to a signalling interaction result.

The embodiments of the present disclosure further provide a method for implementing air interface synchronization, which includes that:

a target cell notifies adjacent cells of information about its own monitoring sub-frame position for air interface synchronization, wherein the information about the monitoring sub-frame position for air interface synchronization is configured to notify the adjacent cells of executing muting at the sub-frame position.

The embodiments of the present disclosure further provide a cell for implementing air interface synchronization, which includes: a determination processing unit, configured to perform signalling interaction with a target cell and determine whether to switch off or not according to a signalling interaction result.

The embodiments of the present disclosure further provide a cell for implementing air interface synchronization, which include: a notification unit, configured to notify adjacent cells of information about monitoring sub-frame position for air interface synchronization of the cell, wherein the information about the monitoring sub-frame position for air interface synchronization is configured to notify the adjacent cells of executing muting at the sub-frame position.

The embodiments of the present disclosure further provide a system for implementing air interface synchronization, which includes the abovementioned two cells.

According to the method, cell and system for implementing air interface synchronization provided by the embodiments of the present disclosure, the source cell performs signalling interaction with the target cell, and determines whether to be switched off or not according to the signalling interaction result. According to the embodiments of the present disclosure, by signalling interaction between base stations, influence of switching-off of the source cell on air interface synchronization of the target cell is avoided, and moreover, a switching-off mechanism of the source cell is also enhanced to fulfil the aim of saving energy without influence on synchronization of other cells.

BRIEF DESCRIPTION OF THE DRAWINGS

In the drawings (which may not be drawn to scale), similar reference signs may describe similar parts in different views. Similar reference signs with different suffix letters may represent different examples of similar parts. The drawings substantially show each of the embodiments discussed in the present disclosure unlimitedly and exemplarily.

DETAILED DESCRIPTION

In an embodiment of the present disclosure, a source cell performs signalling interaction with a target cell, and determines whether to be switched off according to a signalling interaction result, so as to solve a problem about air interface synchronization of the target cell after the source cell switches off.

Figure 1:
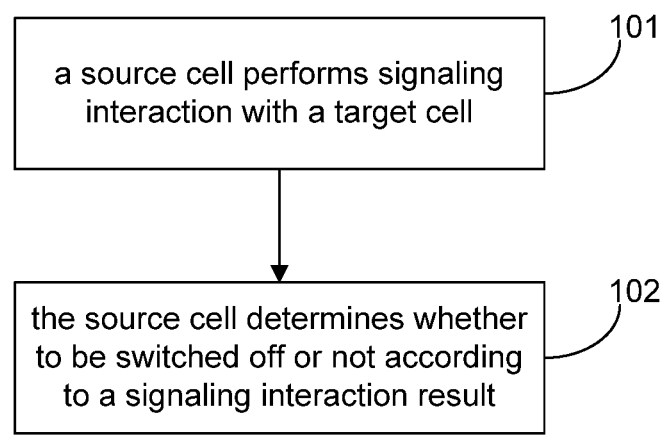
FIG. 1 is an implementation flowchart showing a method for implementing air interface synchronization according to an embodiment of the present disclosure.

FIG. 1 is an implementation flowchart showing a method for implementing air interface synchronization according to an embodiment of the present disclosure. As shown in FIG. 1, the method includes:

Step 101: a source cell performs signalling interaction with a target cell; and

Step 102: the source cell determines whether to be switched off or not according to a signalling interaction result.

Herein, a content about which the source cell performs signalling interaction with the target cell includes at least one of:

on/off state information of the source cell, on/off state information of the target cell, whether the target cell finds a new synchronization source or not, timing at which the source cell enters an off state, candidate synchronization source cell set information of the target cell and associated affiliated target cell information of the target cell.

Herein, a manner for signalling interaction between the source cell and the target cell includes: a periodical interaction manner, or an event-triggered interaction manner, or an interaction manner combining the periodical interaction manner and the event-triggered interaction manner.

In an embodiment, the step that the source cell performs signalling interaction with the target cell and determines whether to be switched off or not according to the signalling interaction result includes that:

the source cell notifies the target cell of the timing at which the source cell enters the off state, and determines whether to enter the off state at the preset time based on feedback information from the target cell, wherein the feedback information from the target cell is whether the target cell finds the new synchronization source or not during monitoring for new air interface synchronization.

Herein, the step that the source cell determines whether to enter the off state at the preset time based on the feedback information from the target cell includes that:

if the feedback information from the target cell indicates that the new synchronization source has been found, the source cell enters the off state at the preset switching-off time; and if the feedback information from the target cell indicates that the new synchronization source fails to be found, the source cell is not allowed to enter the off state.

In an embodiment, the step that the source cell performs signalling interaction with the target cell and determines whether to be switched off or not according to the signalling interaction result includes that:

the source cell configures a monitoring sub-frame of the target cell, and determines whether to be switched off or not according to the on/off state information, reported by the target cell, of the target cell.

Herein, the step that the source cell determines whether to be switched off or not according to the on/off state information, reported by the target cell, of the target cell includes that:

if all affiliated target cells of the source cell are in the off state and the source cell is about to enter the off state, the source cell enters the off state at the preset switching-off time; otherwise, if some affiliated target cells of the source cell are in an on state, some are in the off state and the source cell is about to enter the off state, the source cell is not allowed to enter the off state.

In an embodiment, the step that the source cell performs signalling interaction with the target cell and determines whether to be switched off or not according to the signalling interaction result includes that:

the source cell configures the monitoring sub-frame of the target cell to ensure that the source cell may be monitored by the target cell at the monitoring sub-frame of the target cell.

Herein, the operation that the source cell is ensured to be monitored by the target cell at the monitoring sub-frame of the target cell specifically includes that:

the source cell is kept in the on state, or the source cell is changed from the off state to the on state at the monitoring sub-frame of the target cell, or the source cell sends an air interface synchronization signal at the monitoring sub-frame of the target cell.

In an embodiment, the step that the source cell performs signalling interaction with the target cell and determines whether to be switched off or not according to the signalling interaction result includes that:

the source cell configures the monitoring sub-frame of the target cell, and/or configures that the target cell reports state information to the source cell; and the source cell determines whether to enter the off state or not according to the state information reported by the target cell.

Herein, the state information reported by the target cell includes at least one of: the on/off state information of the target cell, the affiliated target cell information of the target cell and the candidate synchronization source cell set information of the target cell.

In an embodiment, the step that the source cell performs signalling interaction with the target cell and determines whether to be switched off or not according to the signalling interaction result includes that:

the source cell configures the monitoring sub-frame of the target cell, and/or configures that the target cell reports the state information to the source cell; and the source cell determines whether the target cell is required to be switched to a cell in a candidate synchronization source cell set as a new synchronization source cell or not according to the state information reported by the target cell.

Herein, the state information reported by the target cell includes at least one of: the on/off state information of the target cell, the affiliated target cell information of the target cell and the candidate synchronization source cell set information of the target cell.

In an embodiment, the method further includes that:

the source cell selects an off state, and executes operation corresponding to the off state according to selection, wherein the off state selected by the source cell includes one of that:

the source cell is completely switched off, or the source cell only sends a Discovery Signal (DS), or the source cell sends the DS and an air interface synchronization reference signal, or the source cell only sends the air interface synchronization reference signal, or the source cell does not send the air interface synchronization reference signal and/or the DS and only monitors the feedback state information from the target cell and determines whether to be activated at a position of the monitoring sub-frame of the target cell based on the feedback state information, or the source cell only sends the air interface synchronization reference signal at the position of the monitoring sub-frame of the target cell and is off at other time.

Herein, each of the DS and the air interface synchronization reference signal is one or a combination of two of the following signals: a Cell-specific Reference Signal (CRS), a Channel State Indication Reference Signal (CSI-RS), a Positioning Reference Signal (PRS) and a new specific reference signal.

In the embodiment, a configuration information or signalling interaction method for the source cell and the target cell includes at least one of: a system message configuration-based method, an inter-eNB X2 interface-based method, a Radio Resource Control (RRC) protocol signalling configuration-based method, a physical layer signalling-based method and an S1-interface-based method.

Figure 2:
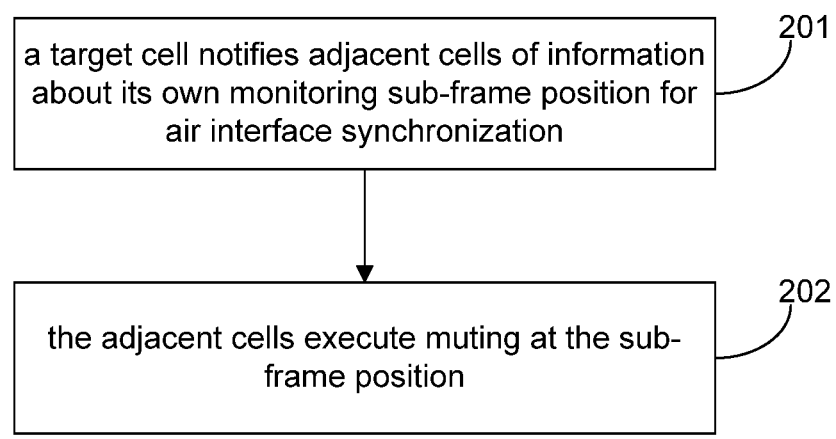
FIG. 2 is an implementation flowchart showing a method for implementing air interface synchronization according to another embodiment of the present disclosure.

The embodiments of the present disclosure further provide another method for implementing air interface synchronization. As shown in FIG. 2, the method includes:

Step 201: a target cell notifies adjacent cells of information about its own monitoring sub-frame position for air interface synchronization; and Step 202: the adjacent cells execute muting at the sub-frame position.

In an embodiment, the method further includes that:

the target cell attempts to monitor available source cells around for air interface synchronization, and notifies the adjacent cells of candidate synchronization source cells, wherein the candidate synchronization source cells include: cells belonging to the same operator with the target cell, and also include cells belonging to different operators from the target cell.

Herein, the adjacent cells include cells belonging to the same operator with the target cell, and also include cells belonging to different operators from the target cell.

Herein, the information about the monitoring sub-frame position for air interface synchronization is obtained according to a sub-frame position of the target cell.

According to the embodiments of the present disclosure, by signalling interaction between eNBs, influence of switching-off of a source cell on air interface synchronization of the target cell is avoided, and moreover, a switching-off mechanism of the source cell is also enhanced to fulfil the aim of saving energy without influence on synchronization of other cells.

Multiple implementation manners may be adopted for an implementation process of the methods provided by the embodiments of the present disclosure, and include at least one of the following manners.

Manner 1: in the embodiments of the present disclosure, the source cell notifies the target cell of the information about its switching-off time at the monitoring sub-frame of the target cell, the target cell tries to perform monitoring for new air interface synchronization within the switching-off time of the source cell, and feeds back information about whether the new synchronization source is found or not and the like to the source cell, the source cell determines whether to be switched off or not on the basis of the feedback information from the target cell. For example, if the target cell feeds back that the new synchronization source may be found, the source cell enters the off state at the preset switching-off time, and if the target cell feeds back that the new synchronization source may not be found, the source cell is delayed to enter the off state at the preset switching-off time, and is namely delayed to be switched off, or the source cell determines not to enter the off state.

In such a manner, it is assumed that signalling interaction between the source cell and the target cell gets abnormal. For example, a part of target cells get out of synchronization with the source cell and thus do not receive information notified by the source cell at the switching-off time, or the target cells correctly receive the information but get out of synchronization with the source cell when feeding back the information about whether new synchronization source is found or not to the source cell. Under the two abnormal conditions, related processing is performed according to the condition that the target cell does not find the new synchronization source if the source cell does not receive the feedback information from all of the target cells.

Manner 2: in the embodiments of the present disclosure, the source cell configures the monitoring sub-frame of the target cell on the basis of its own resource load condition and its own corresponding synchronization level information, the target cell monitors the air interface synchronization reference signal sent by the source cell at the positions of the configured monitoring sub-frames, and the target cell reports its own on/off state information to the source cell; and if all the affiliated target cells of the source cell are in the off state and the source cell is about to enter the off state, the source cell enters the off state at the preset switching-off time, otherwise, if some of the affiliated target cells of the source cell are in the on state, some are in the off state and the source cell is about to enter the off state, the source cell determines to be delayed to enter the off state at the preset switching-off time, or determines not to enter the off state.

Manner 3: in the embodiments of the present disclosure, the source cell configures the monitoring sub-frame of the target cell on the basis of its own resource load condition and its own corresponding synchronization level information, the target cell monitors the air interface synchronization reference signal sent by the source cell at the positions of the configured monitoring sub-frames, and the source cell enters the off state at the preset switching-off time regardless of the on/off state of the target cell, and is awakened to send the air interface synchronization reference signal at the positions of the monitoring sub-frames of the target cell.

Manner 4: in the embodiments of the present disclosure, the source cell configures the information about the monitoring sub-frame of the target cell, and configures that the target cell reports the state information to the source cell, the state information reported by the target cell including at least one of: the on/off state information of the target cell, the affiliated target cell information of the target cell and the candidate synchronization source cell set information of the target cell; and the source cell determines whether it may enter the off state or not according to the state information reported by the target cell.

Manner 5: in the embodiments of the present disclosure, the source cell configures the information about the monitoring sub-frame of the target cell, and configures that the target cell reports the state information to the source cell, the state information reported by the target cell including at least one of: the on/off state information of the target cell, the affiliated target cell information of the target cell and the candidate synchronization source cell set information of the target cell; and the source cell determines whether the target cell is required to be switched to a certain cell in the candidate synchronization source cell set as the new synchronization source cell or not according to the state information reported by the target cell.

Manner 6: in the embodiments of the present disclosure, the source cell selects a proper off state, and executes operation corresponding to the off state, wherein the off state selected by the source cell includes that: 1) the source cell is completely switched off; 2) the source cell only sends the DS; 3) the source cell sends the DS and the air interface synchronization reference signal; 4) the source cell only sends the air interface synchronization reference signal; 5) the source cell does not send the air interface synchronization reference signal/DS but monitors the feedback state information from the target cell and determines whether to be activated at the position of the monitoring sub-frame of the target cell or not on the basis of the feedback state information; and 6) the source cell only sends the air interface synchronization reference signal at the position of the monitoring sub-frame of the target cell, and is off at the other time except for the position of the monitoring sub-frame of the target cell.

Each of the DS and the air interface synchronization reference signal may be a combination of the following signals: a CRS, a CSI-RS, a PRS and a new specific reference signal, wherein configuration periods and sending sub-frame positions of the DS and the air interface synchronization reference signal may be configured to be the same, and may also be configured to be different.

Manner 7: in the embodiments of the present disclosure, the target cell tries to monitor the available source cells around for air interface synchronization, wherein the available source cells include cells of the same operators, namely, the cells belong to the same operator with the target cell, and also include cells of different operators, namely, the cells belong to different operators from the target cell. The target cell notifies its own adjacent cells of the information about the corresponding monitoring sub-frame position during monitoring of candidate synchronization source cells, wherein the information about the corresponding monitoring sub-frame position during monitoring of the candidate synchronization source cells may be understood as information about an optimal sub-frame position for synchronization source cell air interface discovery of the target cell. The adjacent cells and the target cell belong to the same operator, or belong to different operators. Of course, the candidate synchronization source cells also belong to a set of the adjacent cells. The adjacent cells and the target cell coordinate at the position of the monitoring sub-frame of the target cell on the basis of interaction between the target cell and the adjacent cells to avoid interference to the target cell in air interface synchronization monitoring. For example, in an inter-operator adjacent frequency band scenario, cells belonging to different operators may negotiate with respect to which cells to perform coordination and monitoring at what time/sub-frames while the other adjacent cells which may cause interference execute operation of muting and the like at the time/sub-frames.

Herein, the configuration information or signalling interaction method for the source cell and the target cell in the abovementioned manners includes at least one of: the system message configuration-based method, the inter-eNB X2 interface-based method, the RRC protocol signalling configuration-based method, the physical layer signalling-based method and the S1-interface-based method.

Herein the system message configuration-based method is implemented by configuring a related domain of an LTE System Information Block (SIB) message, and a domain in an original SIB message may be reused, or a new SIB message domain may be introduced. The inter-eNB X2 interface-based method is implemented between an eNB and a plurality of adjacent eNBs, and signalling information is exchanged when necessary. The RRC protocol signalling configuration-based method implements interaction about related signalling during establishment of an RRC connection or reconfiguration of the connection. The physical layer signalling-based method exchanges air interface synchronization related signalling by virtue of physical layer control signalling, such as Downlink Control Information (DCI). The S1-interface-based method implements communication between eNBs through a Mobility Management Entity (MME). For example, HeNB_1 sends a message including a target eNB Identifier (ID) and a synchronization information request to the MME, the MME sends the request to a target eNB ((H)eNB_2) through a related message. (H)eNB_2 gives a response to the MME through related information after receiving the message, wherein the response message includes the (H)eNB_2's own synchronization level number and synchronization state information.

Herein, the content about which the source cell performs signalling interaction with the associated target cell in the abovementioned manners includes at least one of: the on/off state information of the source cell, the on/off state information of the target cell, whether the target cell finds the new synchronization source cell or not, the timing at which the source cell enters the off state, the candidate synchronization source cell set information of the target cell and the associated affiliated target cell information of the target cell.

Herein, the manner for signalling interaction between the source cell and the target cell in the abovementioned manners may include the periodical interaction manner, or the event-triggered interaction manner, or the interaction manner combining the two manners.

The methods provided by the embodiments of the present disclosure will be described below in combination with specific application scenarios in detail.

Embodiment 1

In a small cell deployment scenario, a position of a monitoring sub-frame of a target cell is [SF2, RF3], a period is T and current time t1 is exactly the position of the monitoring sub-frame of the target cell. A source cell notifies the target cell of its switching-off time information t2 at the monitoring sub-frame of the target cell, that is, the source cell is about to enter an off state at t2. The target cell tries to perform monitoring for new air interface synchronization within a time period from t1 to t2, and feeds back information about whether a new synchronization source is found or not and the like to the source cell. The source cell determines whether to be switched off or not on the basis of the feedback information from the target cell. For example, within the time period from t1 to t2, if the target cell feeds back that the new synchronization source may be found, the source cell enters the off state at the preset switching-off time t2; otherwise, the source cell is delayed to be switched off at the preset switching-off time t2, or the source cell determines not to enter the off state.

Embodiment 2

In a small cell deployment scenario, a position of a monitoring sub-frame of a target cell is [SF2, RF3] and a period is T. The target cell monitors an air interface synchronization reference signal sent by a source cell at the position of the monitoring sub-frame, and the target cell periodically reports its on/off state information to the source cell. By interaction between the target cell and the source cell, the source cell acquires the number and states of its affiliated target cells. if the source cell is about to enter an off state at t2 and all of the affiliated target cells of the source cell are in the off state, the source cell may enter the off state at the preset switching-off time t2; otherwise, if not all of the affiliated target cells of the source cell are in the off state, the source cell may be delayed to be switched off at the preset switching-off time t2. Alternatively, under the condition that not all of the affiliated target cells of the source cell are in the off state, the source cell still enters the off state at the preset switching-off time t2. However, the source cell is awakened at the position [SF2, RF3] of the monitoring sub-frame of the target cell and sends the air interface synchronization reference signal.

Embodiment 3

In a small cell deployment scenario, a position of a monitoring sub-frame of a target cell is [SF2, RF3] and a period is T. The target cell monitors an air interface synchronization reference signal sent by a source cell at the position of the monitoring sub-frame, and the target cell periodically reports its state information to the source cell, and the state information reported by the target cell includes at least one of: on/off state information of the target cell, affiliated target cell information of the target cell and candidate synchronization source cell set information of the target cell. For example, if the target cells report the candidate synchronization source cell set information, candidate synchronization source cells reported by all of the affiliated target cells of the source cell include the source cell, and the source cell is a unique candidate synchronization source for a certain number of affiliated target cells, that is, these target cells cannot find a proper synchronization source after the source cell is switched off, the source cell determines not to be switched off on the basis of the reported state information.

Embodiment 4

Figure 3:
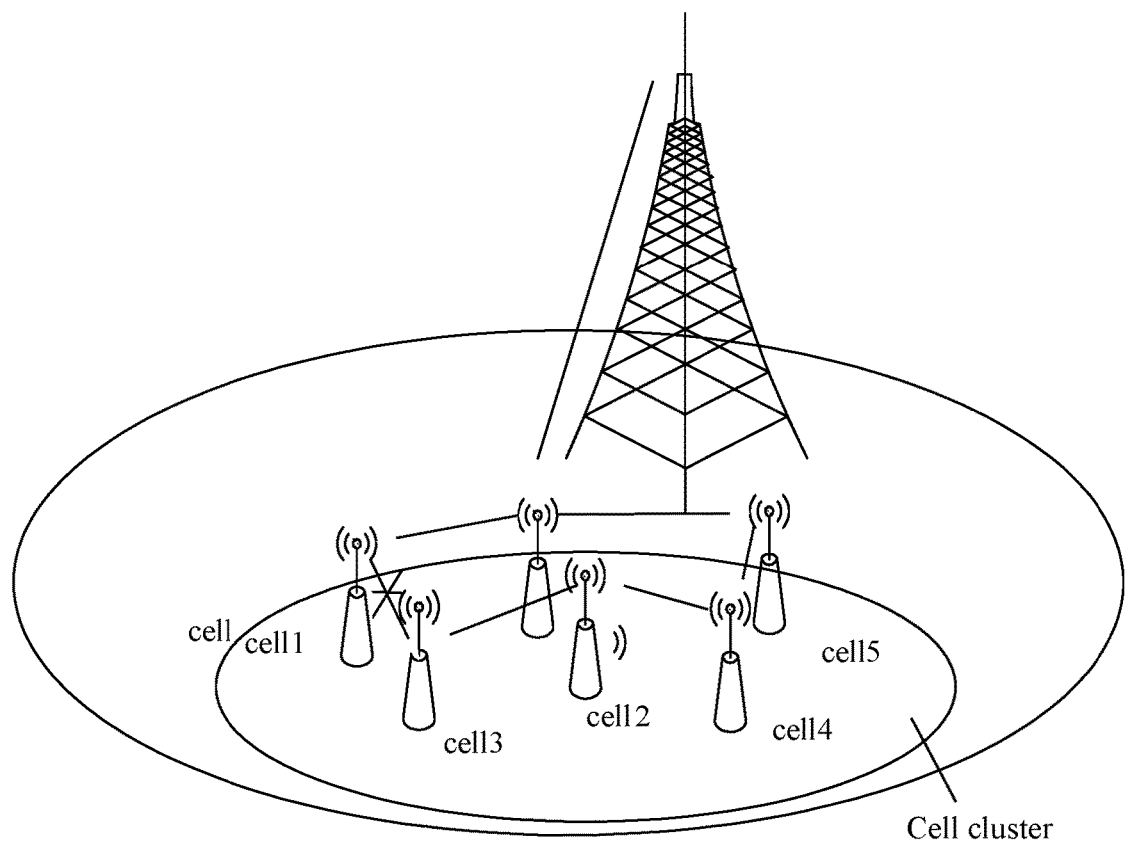
FIG. 3 is a diagram illustrating a network topology of a specific application scenario corresponding to embodiment 4 of the present disclosure.

As shown in FIG. 3, an initial synchronization source of cell3 is cell1, the source cell configures information about a monitoring sub-frame of a target cell, the target cell automatically or is configured by the source cell to periodically perform new synchronization source cell discovery, and the target cell is configured to report state information to the source cell, wherein the state information reported by the target cell includes at least one of: on/off state information of the target cell, affiliated target cell information of the target cell and candidate synchronization source cell set information of the target cell. At this moment, if cell3 reports candidate synchronization source cell set information to cell1 and cell1 enters an off state at time t1, cell3 selects a new synchronization source cell2 from a candidate synchronization source cell set, and the target cell cell3 periodically performs new synchronization source cell discovery. If cell1 is reactivated to enter an on state at time t2, cell3 discovers that cell1 may serve as its candidate synchronization source cell in a periodical synchronization source cell discovery process, and cell3 feeds back such information to the source cell cell2, a synchronization level of the synchronization source cell cell2 being 4 and a synchronization level of the original synchronization source cell cell1 being 2 at this moment, cell2 may notify cell3 of performing synchronization source cell handover operation and notify cell3 of related information about the new synchronization source cell1, and then cell3 may monitor an air interface synchronization monitoring reference signal sent by cell1 to implement air interface synchronization at a new monitoring sub-frame time.

If cell1 (which may serve as a candidate source cell of cell3) is activated at t3 and notifies cell3 of activation information, cell3 executes a process of reselecting the synchronization source cell after cell3 receives such a notification.

Embodiment 5

In a small cell deployment scenario, a position of a monitoring sub-frame of a target cell is [SF2, RF3], a period is T, current time t1 is exactly the position of the monitoring sub-frame of the target cell and the source cell may enter an off state at time t2, t2>t1 and t2−t1<T, the source cell entering the off state does not send an air interface synchronization reference signal/DS, and monitors feedback state information from the target cell. At the next monitoring time t1+T of the target cell, the target cell does not monitor the air interface synchronization reference signal of the source cell, then the target cell triggers new air interface synchronization monitoring trying, and feeds back information about whether a new synchronization source is found or not and the like to the source cell, and the source cell determines whether it is required to be activated to send the air interface synchronization reference signal or the DS on the basis of the feedback information from the target cell. For example, within a time period from t1+T and t1+2T, if the target cell feeds back that the new synchronization source may be found, the source cell is kept in the off state; otherwise the source cell is activated to send the air interface synchronization reference signal or the DS for air interface monitoring of the target cell at time t1+NT (N is more than or equal to 2), and is still in the off state at other time.

Embodiment 6

In a small cell deployment scenario, an off state selectable for a source cell includes one or more of the following states that: 1) the source cell is completely switched off; 2) the source cell only sends a DS; 3) the source cell sends the DS and an air interface synchronization reference signal; 4) the source cell only sends the air interface synchronization reference signal; 5) the source cell does not send the air interface synchronization reference signal/DS but monitors feedback state information from a target cell and determines whether to send the air interface synchronization reference signal at a position of a monitoring sub-frame of the target cell or not on the basis of the feedback state information; and 6) the source cell only sends the air interface synchronization reference signal at the position of the monitoring sub-frame of the target cell, and is off at the other time except the position of the monitoring sub-frame of the target cell.

When the source cell selects off state 4), the source cell monitors the feedback state information, for example, whether the target cell finds a new synchronization source or not, of the target cell within time when the source cell is off, and if the target cell feeds back that the new synchronization source is not found, the source cell is completely switched off and does not send the air interface synchronization reference signal/DS at other sub-frames except the monitoring sub-frame of the target cell, and only sends the air interface synchronization reference signal at the position of the monitoring sub-frame of the target cell.

Embodiment 7

In a small cell deployment scenario, if small cells of two operators are deployed in the same area, for example, operators A and B, the small cells of operators A and B are deployed in adjacent frequency bands and a target cell is a small cell of operator A, the target cell tries to monitor available source cells around for air interface synchronization, the available source cells including cells of the same operator and also including cells of the different operator; the target cell notifies its own adjacent cells of information about a position of a corresponding monitoring sub-frame during candidate synchronization source cell monitoring, the information about the position of the monitoring sub-frame taking the target cell as a reference. If candidate synchronization source cells are {A1, A2, B1}, A1 and A2 belonging to small cells of operator A and B1 belonging to a small cell of operator B, the adjacent cells notified by the target cell include cells of the same operator and also include cells of the different operators and the candidate synchronization source cells are also in a set of the adjacent cells, the target cell performs interference coordination operation with the adjacent cells on the basis of interaction information of the adjacent cells and the target cell. For example, they may negotiate about that some specific cells perform coordination and monitoring at specific time/sub-frames while the other adjacent cells which may cause interference execute operation of muting and the like at the time/sub-frames. If the monitoring sub-frame of the target cell for candidate source cell B1 is [SF4, RF4], it is negotiated that the adjacent cells which may cause interference to the target cell perform muting at the sub-frame [SF4, RF4], which may prevent monitoring performance reduction caused by interference of the adjacent cells when the target cell monitors the cells of the other operator.

Embodiment 8

In a small cell deployment scenario, a position of a monitoring sub-frame of a target cell is [SF2, RF3], a period is T, a synchronization source cell of the target cell enters an off state at t1 and t2 is exactly the position of the monitoring sub-frame of the target cell, (t2−T<t1>t2). The operation which may be executed by the source cell at t2 includes that: 1) the source cell is completely switched off; 2) the source cell only sends a DS; 3) the source cell sends the DS and an air interface synchronization reference signal; 4) the source cell only sends the air interface synchronization reference signal; 5) the source cell does not send the air interface synchronization reference signal/DS but monitors feedback state information from the target cell and determines whether to send the air interface synchronization reference signal at the position of the monitoring sub-frame of the target cell or not on the basis of the feedback state information; and 6) the source cell only sends the air interface synchronization reference signal at the position of the monitoring sub-frame of the target cell, and is off at the other time.

Herein, each of the DS and the air interface synchronization reference signal may be a combination of the following signals: a CRS, a CSI-RS, a PRS and a new specific reference signal, wherein combined forms of DS and the air interface synchronization reference signal may be the same, for example, they may both be CRSs, or CSI-RSs, or PRSs or different signal forms, and when the DS and the air interface synchronization reference signal are both CSI-RSs or PRSs, and adopt different signal forms, configuration periods and sending sub-frame positions of the DS and the air interface synchronization reference signal may be configured to be the same, and may also be configured to be different.

Embodiment 9

In a small cell deployment scenario, small cells of two operators are deployed in the same area, for example, operators A and B, the small cells of operators A and B are deployed in adjacent frequency bands and a target cell is a small cell of operator A, the target cell tries to monitor available source cells around for air interface synchronization, the available source cells including cells of the same operator and also including cells of the different operators; the target cell notifies its own adjacent cells of information about a position of a corresponding monitoring sub-frame during candidate synchronization source cell monitoring, the information about the position of the monitoring sub-frame taking the target cell as a reference. If candidate synchronization source cells are {A1, A2, B1}, A1 and A2 belonging to small cells of operator A and B1 belonging to a small cell of operator B, and the adjacent cells notified by the target cell are cells of the same operator with the target cell, the target cell performs interference coordination operation with the adjacent cells on the basis of interaction information of the adjacent cells and the target cell. For example, they may negotiate about that some specific cells perform coordination and monitoring at specific time/sub-frames while the other adjacent cells which may cause interference execute operation of muting and the like at the time/sub-frames. If the monitoring sub-frame of the target cell for candidate source cell B1 is [SF4, RF4], it is negotiated that the adjacent cells (the cells of operator A) which may cause interference to the target cell perform muting at the sub-frames [SF4, RF4], which may prevent monitoring performance reduction caused by interference of the adjacent cells when the target cell monitors the cells of the other operator. A manner for interaction between the target cell and the adjacent cells may be implemented by at least one of: a system message configuration-based method, an inter-eNB X2 interface-based method, an RRC protocol signalling configuration-based method, a physical layer signalling-based method and an S1-interface-based method.

Figure 4:
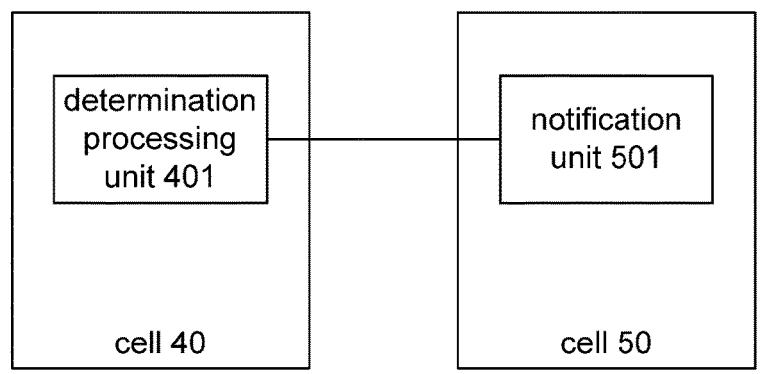
FIG. 4 is a structure diagram illustrating a system for implementing air interface synchronization according to an embodiment of the present disclosure.

The embodiments of the present disclosure further provide a cell 40 for implementing air interface synchronization. As shown in FIG. 4, the cell 40 includes a determination processing unit 401, configured to perform signalling interaction with a target cell and determines whether to switch the cell off or not according to a signalling interaction result.

In an embodiment, the determination processing unit 401 is configured to notify the target cell of timing at which the cell enters an off state, and determine whether the cell enters the off state at the preset time or not on the basis of feedback information from the target cell, the feedback information from the target cell being: whether the target cell finds a new synchronization source or not during monitoring for new air interface synchronization.

In an embodiment, the determination processing unit 401 is configured to configure a monitoring sub-frame of the target cell, and determine whether to switch the cell off or not according to on/off state information, reported by the target cell, of the target cell.

In an embodiment, the determination processing unit 401 is configured to configure the monitoring sub-frame of the target cell to ensure that the cell may be monitored by the target cell at the monitoring sub-frame of the target cell.

Herein, the operation that the determination processing unit ensures that the cell may be monitored by the target cell at the monitoring sub-frame of the target cell includes that:

the determination processing unit ensures that the cell is kept in an on state, or ensures that the cell is changed from the off state to the on state at the monitoring sub-frame of the target cell, or ensures that the cell sends an air interface synchronization signal at the monitoring sub-frame of the target cell.

In an embodiment, the determination processing unit 401 is configured to configure the monitoring sub-frame of the target cell, and/or configure that the target cell reports state information to the cell; and determine whether the cell enters the off state or not according to the state information reported by the target cell.

Herein, the state information reported by the target cell includes at least one of: the on/off state information of the target cell, affiliated target cell information of the target cell and candidate synchronization source cell set information of the target cell.

In an embodiment, the determination processing unit 401 is configured to configure the monitoring sub-frame of the target cell, and/or configure that the target cell reports the state information to the cell; and determine whether the target cell is required to be switched to a cell in a candidate synchronization source cell set as a new synchronization source cell or not according to the state information reported by the target cell.

In an embodiment, the determination processing unit 401 is further configured to select an off state for the cell, and execute operation corresponding to the off state according to selection, wherein the off state selected by the source cell includes one of that:

the cell is completely switched off, or the cell only sends a DS, or the cell sends the DS and an air interface synchronization reference signal, or the cell only sends the air interface synchronization reference signal, or the cell does not send the air interface synchronization reference signal and/or the DS and only monitors the feedback state information of the target cell and determines whether to be activated at a position of the monitoring sub-frame of the target cell or not on the basis of the feedback state information, or the cell only sends the air interface synchronization reference signal at the position of the monitoring sub-frame of the target cell and is off at other time.

Herein, the determination processing unit 401 may be implemented by a Central Processing Unit (CPU), Digital Signal Processor (DSP) or Field-Programmable Gate Array (FPGA) in the cell 40.

The embodiments of the present disclosure further provide a cell 50 for implementing air interface synchronization. As shown in FIG. 4, the cell 50 includes: a notification unit 501, configured to notify adjacent cells of information about its own monitoring sub-frame position for air interface synchronization, the information about the monitoring sub-frame position for air interface synchronization being configured to notify the adjacent cells of executing muting at the sub-frame position.

In an embodiment, the notification unit 501 is further configured to try to monitor available source cells around for air interface synchronization, and notify the adjacent cells of candidate synchronization source cells, Herein the candidate synchronization source cells include: cells belonging to the same operator with the target cell, and also include cells belonging to different operators from the target cell.

Herein, the adjacent cells include cells belonging to the same operator with the target cell, and also include cells belonging to different operators from the target cell.

Herein, the information about the monitoring sub-frame position for air interface synchronization is obtained according to a sub-frame position of the target cell.

Herein, the notification unit 501 may be implemented by a CPU, DSP or FPGA in the cell 50.

The embodiments of the present disclosure further provide a system for implementing air interface synchronization including the abovementioned cell 40 and cell 50.

According to the embodiments of the present disclosure, by signalling interaction between eNBs, influence of switching-off of the source cell on air interface synchronization of the target cell is avoided, and moreover, a switching-off mechanism of the source cell is also enhanced to fulfil the aim of saving energy without influence on synchronization of another cell.

The candidate synchronization source cells or candidate synchronization source cell set in the specification may include one or more cells, for example, the condition that the preferred synchronization source cell in embodiments 7 and 9 is the same cell.

The source cell currently monitored by the target cell in the specification is also included in the candidate synchronization cells or candidate synchronization source cell set information of the target cell.

Those skilled in the art should know that the embodiments of the present disclosure may be provided as a method, a system or a computer program product. Therefore, the present disclosure may adopt a form of pure hardware embodiment, pure software embodiment and combination thereof. Moreover, the present disclosure may adopt a form of computer program product implemented on one or more computer-available storage media (including, but not limited to, a disk memory, an optical memory and the like) including computer-available program codes.

The present disclosure is described with reference to flowcharts and/or block diagrams of the method, equipment (system) and computer program product according to the embodiments of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred embodiments of the present disclosure and not intended to limit the scope of the present disclosure.

The invention claimed is:

1. A method for implementing air interface synchronization, comprising:
performing, by a source cell, signalling interaction with a target cell, and determining whether to be switched off or not according to a signalling interaction result, wherein the step of performing, by the source cell, signalling interaction with the target cell and determining whether to be switched off or not according to the signalling interaction result comprises:
configuring, by the source cell, a monitoring sub-frame of the target cell, and sending an air interface synchronization reference signal at the positions of the configured monitoring sub-frames;
configuring, by the source cell, the target cell to report state information to the source cell; and
determining whether to enter an off state or not according to the state information reported by the target cell,
wherein the state information reported by the target cell comprises at least one of: on/off state information of the target cell or candidate synchronization source cell set information of the target cell,
wherein the method further comprises:
notifying, by the source cell, the target cell of a preset switching-off time at which the source cell enters an off state, and determining whether to enter the off state at the preset switching-off time based on feedback information from the target cell, wherein the feedback information from the target cell comprises whether the target cell finds a new synchronization source or not during monitoring for new air interface synchronization,
wherein the step of determining, by the source cell, whether to enter the off state at the preset switching-off time based on the feedback information from the target cell comprises:
in the case that the feedback information from the target cell indicates that the new synchronization source is found, causing the source cell to enter the off state at the preset switching-off time; and in the case that the feedback information from the target cell indicates that the new synchronization source fails to be found, not allowing the source cell to enter the off state.

2. The method according to claim 1, wherein a content about which the source cell performs signalling interaction with the target cell comprises at least one of:
on/off state information of the source cell, on/off state information of the target cell, whether the target cell finds a new synchronization source or not, timing at which the source cell enters an off state, candidate synchronization source cell set information of the target cell and associated affiliated target cell information of the target cell.

3. The method according to claim 1, wherein the signalling interaction with the target cell is performed by the source cell in a manner of: periodical interaction, or event-triggered interaction, or a combination thereof.

4. The method according to claim 1, further comprising:
configuring, by the source cell, a monitoring sub-frame of the target cell to ensure that the source cell is monitored by the target cell at the monitoring sub-frame of the target cell,
wherein ensuring that the source cell is monitored by the target cell at the monitoring sub-frame of the target cell comprises:
keeping the source cell in an on state, or changing the source cell from an off state to the on state at the monitoring sub-frame of the target cell, or sending, by the source cell, an air interface synchronization signal at the monitoring sub-frame of the target cell.

5. The method according to claim 1, further comprising:
determining, by the source cell, whether the target cell is required to be switched to a cell in a candidate synchronization source cell set as a new synchronization source cell or not according to the state information reported by the target cell,
wherein the state information reported by the target cell comprises at least one of:
on/off state information of the target cell, affiliated target cell information of the target cell and the candidate synchronization source cell set information of the target cell.

6. The method according to claim 1, further comprising:
selecting, by the source cell, an off state, and executing operation corresponding to the off state according to selection,
wherein the off state selected by the source cell comprises one of that:
the source cell is completely switched off, or the source cell only sends a Discovery Signal (DS), or the source cell sends the DS and an air interface synchronization reference signal, or the source cell only sends the air interface synchronization reference signal, or the source cell does not send the air interface synchronization reference signal and/or the DS and only monitors feedback state information from the target cell and determines whether to be activated at a position of the monitoring sub-frame of the target cell or not based on the feedback state information, or the source cell only sends the air interface synchronization reference signal at the position of the monitoring sub-frame of the target cell and is off at other time,
wherein each of the DS and the air interface synchronization reference signal is one or a combination of two of the following signals:
a Cell-specific Reference Signal (CRS), a Channel State Indication Reference Signal (CSI-RS), a Positioning Reference Signal (PRS) and a new specific reference signal.

7. The method according to claim 1, wherein a configuration information or signalling interaction method for the source cell and the target cell comprises at least one of:
a system message configuration-based method, an inter-Evolved Node B (eNB) X2 interface-based method, a Radio Resource Control (RRC) protocol signalling configuration-based method, a physical layer signalling-based method and an S1-interface-based method.

8. A cell for implementing air interface synchronization, comprising:
a processor, configured to perform signalling interaction with a target cell and determine whether to switch off or not according to a signalling interaction result,
wherein in order to perform signalling interaction with a target cell and determine whether to switch off or not according to a signalling interaction result, the processor is configured to:
configure, by the source cell, a monitoring sub-frame of the target cell, and send an air interface synchronization reference signal at the positions of the configured monitoring sub-frames;
configure, by the source cell, the target cell to report state information to the source cell; and
determine whether to enter an off state or not according to the state information reported by the target cell, wherein the state information reported by the target cell comprises at least one of: on/off state information of the target cell or candidate synchronization source cell set information of the target cell;

a storage media, configured to store computer-executable program codes capable of running on the processor, wherein the processor is configured to notify the target cell of a preset switching-off time at which the cell enters an off state, and determine whether to enter the off state at the preset switching-off time based on feedback information from the target cell, the feedback information from the target cell being: whether the target cell finds a new synchronization source or not during monitoring for new air interface synchronization.

9. The cell according to claim 8, wherein the processor is configured to configure a monitoring sub-frame of the target cell to ensure that the cell is monitored by the target cell at the monitoring sub-frame of the target cell, and wherein the operation that the processor ensures that the cell is monitored by the target cell at the monitoring sub-frame of the target cell comprises that:

the processor ensures that the cell is kept in an on state, or ensures that the cell is changed from the off state to the on state at the monitoring sub-frame of the target cell, or ensures that the cell sends an air interface synchronization signal at the monitoring sub-frame of the target cell.

10. The cell according to claim 8, wherein the processor is configured to determine whether the target cell is required to be switched to a cell in a candidate synchronization source cell set as a new synchronization source cell or not according to the state information reported by the target cell.

11. A method for implementing air interface synchronization, comprising:

performing, by a source cell, signalling interaction with a target cell, and determining whether to be switched off or not according to a signalling interaction result, wherein the step of performing, by the source cell, signalling interaction with the target cell and determining whether to be switched off or not according to the signalling interaction result comprises:

configuring, by the source cell, a monitoring sub-frame of the target cell, and sending an air interface synchronization reference signal at the positions of the configured monitoring sub-frames;

configuring, by the source cell, the target cell to report state information to the source cell; and determining whether to enter an off state or not according to the state information reported by the target cell, wherein the state information reported by the target cell comprises at least one of: on/off state information of the target cell or candidate synchronization source cell set information of the target cell, wherein the method further comprises:

configuring, by the source cell, a monitoring sub-frame of the target cell, and determining whether to be switched off or not according to on/off state information of the target cell reported by the target cell, wherein the step of determining, by the source cell, whether to be switched off or not according to the on/off state information of the target cell reported by the target cell comprises:

in the case that all affiliated target cells of the source cell are in the off state and the source cell is about to enter the off state at a preset switching-off time, causing the source cell to enter the off state at the preset switching-off time;

in the case that not all the affiliated target cells of the source cell are in the off state and the source cell is about to enter the off state at a preset switching-off time, not allowing the source cell to enter the off state.

12. A cell for implementing air interface synchronization, comprising:

a processor, configured to implement the method of claim 11.

* * * * *